April 28, 1931.  O. C. BRYAN  1,802,627
VEHICLE DIRECTION INDICATOR
Filed May 8, 1922  2 Sheets-Sheet 1
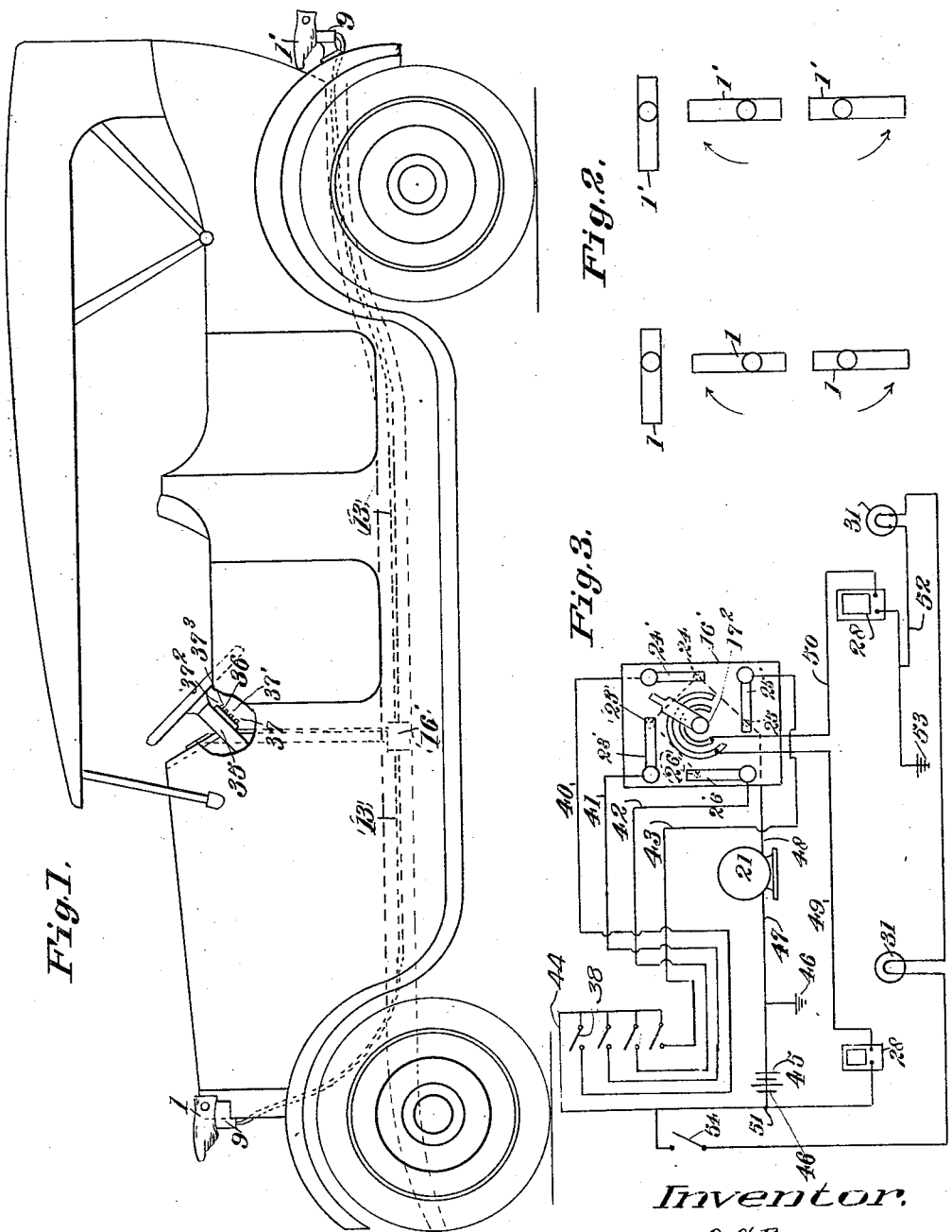

April 28, 1931.  O. C. BRYAN  1,802,627
VEHICLE DIRECTION INDICATOR
Filed May 8, 1922  2 Sheets-Sheet 2
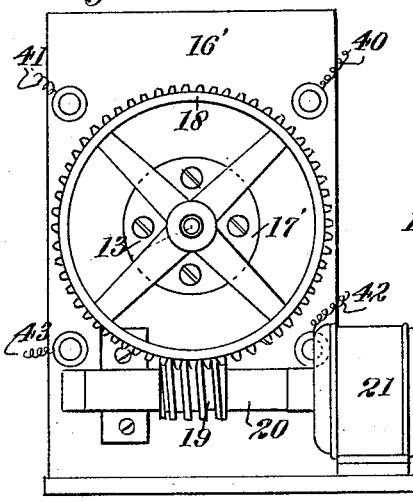
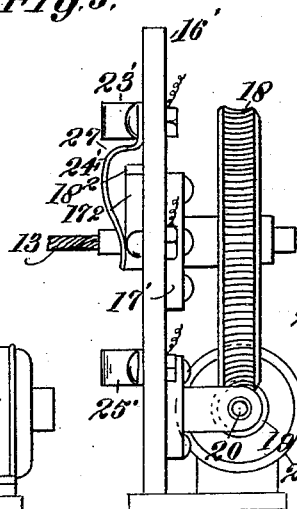
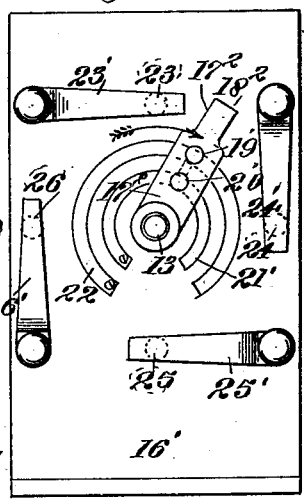
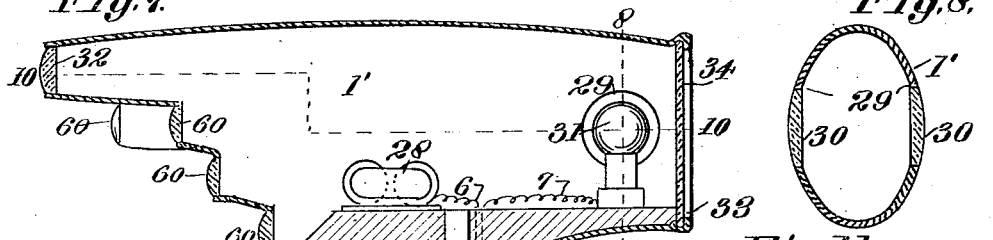
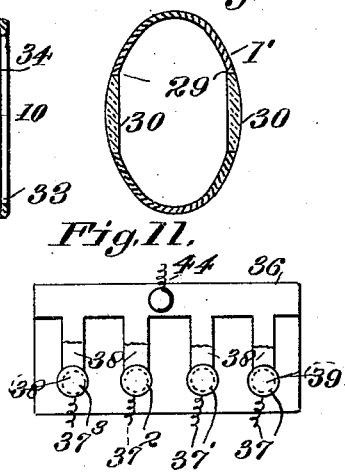
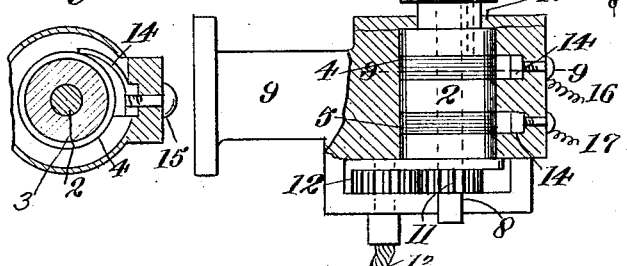
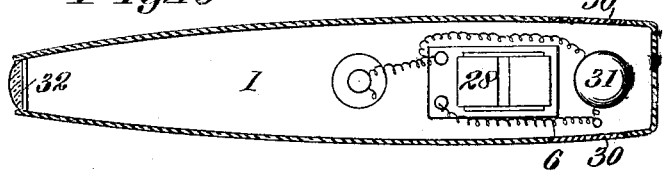
Inventor.
O. C. Bryan,
By Ackerr Totten
Attorneys.

Patented Apr. 28, 1931

1,802,627

UNITED STATES PATENT OFFICE

OTIS C. BRYAN, OF OAKLAND, CALIFORNIA

VEHICLE DIRECTION INDICATOR

Application filed May 8, 1922. Serial No. 559,226.

This invention relates to that type of device commonly known as a vehicle direction indicator, and amongst the advantages in this particular invention over those now in use, is that by the present invention the direction of travel of the equipped vehicle is indicated to those approaching and following by semaphore audible and light signals. A further object is to provide a construction wherein the semaphore is in the form of a directing hand adapted for swinging movement, and when moved out of its normal position is adapted to indicate a turning movement of the vehicle in either lateral direction. A further object is to provide a hollow indicating semaphore adapted to contain and conceal the lamp for illuminating the signal together with the mechanism for making the audible signal.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more clearly comprehend the invention, reference is directed to the accompanying drawings, wherein—

Fig. 1 is a view in side elevation of an automobile equipped with the preferred embodiment of my invention, illustrating the semaphore in a position to indicate the travel of the vehicle straight ahead.

Fig. 2 is a diagrammatic view illustrating in the upper portion the position of the semaphores in the movement of the vehicle straight ahead, in the center their position on a right turn of the vehicle and at the bottom their position on the left turn of the vehicle.

Fig. 3 is a diagrammatic view of the wiring circuit.

Fig. 4 is a view in elevation of the motor and gear for imparting a swinging movement to the semaphore.

Fig. 5 is a view in side elevation of the motor and gear.

Fig. 6 is a view in plan of the rotary contact, the segmental contact and the spring contact arms with which said rotary contact arm operates.

Fig. 7 is a detail view in vertical section of the rear semaphore.

Fig. 8 is a sectional view taken on line 8—8, Fig. 7.

Fig. 9 is a sectional view taken on line 9—9, Fig. 7.

Fig. 10 is a transverse horizontal sectional view through the semaphore at the front end of the vehicle.

Fig. 11 is a rear view of the switch panel.

Referring more particularly to the drawings, wherein like characters of reference designate corresponding parts, 1 and 1' indicate respectively the semaphore members positioned at the front and rear of an equipped motor vehicle, said semaphores being of hollow construction and shaped to indicate from their exterior a conventional direction hand with the index finger outwardly extended. From the base of each semaphore extends a cylindrical tubular spindle 2 carrying a shell 3 of insulating material rotatable therewith. The shell 3 mounts the annular contacts 4 and 5 from which extend wires 6 and 7 leading into the semaphores. The spindle 2 with its shell is received within a bearing opening 8 in a supporting bracket or arm 9 adapted for securing one to the front and one to the rear of a vehicle at any suitable point of attachment.

A cover plate 10 retains the respective spindles 2 within their bearing openings and the lower end of each spindle carries a gear 11 with which intermeshes a driving gear 12 carried on the end of a flexible spindle or driving shaft 13, of the well known type. With the respective contacts 4 and 5 engage the conducting brushes 14 associated with binding posts 15 from which extend the respective wires 16 and 17. The cable 13 being of the conventional flexible type extends preferably along the inner side of the vehicle frame channel and passes through a switch board 16'. The board 16', where the cable 13 passes therethrough, carries a tubular boss 17', affording a journal for a gear 18 to which is secured the cable 13. With the toothed periphery of the gear 18 engages an operating worm 19 carried on a shaft 20 which is in turn connected to the armature of a motor 21.

On its reverse side the plate 16', adjacent its surface, carries a contact arm $17^2$ keyed to rotate with the cable 13 and formed at its outer end with a contact breaker $18^2$, and inwardly from said contact with suitable connected contact buttons 19' and 20', which are adapted to engage with the segmental contacts 21' and 22.

At spaced intervals throughout the rotative path of movement the board 16' mounts at uniformly spaced points the contact points 23, 24, 25 and 26, with each of which co-operates the respective spring contact arms 23', 24', 25' and 26', all disposed with their free ends in one direction in the rotative path and each having a raised portion 27 which permits the passage of the contact breaker $18^2$ of the arm $17^2$ beneath the same during the rotation of the arm $17^2$ in the direction of the arrow—Fig. 6. The contact $18^2$ is preferably formed of suitable insulating material adapted to pass between the contact points 23, 24, 25 and 26 and their associated spring contact arms to break the circuit between any one contact point and its associated spring arm.

The semaphores 1 and 1' are similar to the extent that within each is mounted an audible signal member 28 in the form of a buzzer connected with the respective wires 6, and the side walls of each of said members adjacent their rear ends are formed with aligned openings 29, over each of which is positioned a colored glass 30, preferably one red and one green. Within each of said semaphores is positioned a lamp 31, the light from which is adapted for shining through the glasses 30.

At the end of the index finger of each semaphore, in line with the lamp 31 is also positioned a colored glass 32 and the rear semaphore is opened at its rear end, as at 33, which opening is adapted to be closed by the red glass 34.

Referring to Figs. 3 and 11, the electric circuit is wired as follows: Positioned on the vehicle steering post or the dash panel 35 is a switch panel 36, preferably carrying four push buttons 37, 37', $37^2$ and $37^3$, with each of which cooperates a spring contact 38, each of said contacts being adapted for engaging a contact point 39, and from said points extend the leads 40, 41, 42 and 43. A lead 44 extends from and is connected to all of the fingers 38, and the same connects with a battery 45 grounded as at 46 and the lead 47 of which connects with the motor 21. The leads 40 to 43 inclusive connect with the base of the respective contact fingers 23', 24', 25' and 26', and with the respective contact points 23, 24, 25 and 26 connects the lead 48 which in turn connects with the motor 21. From the respective segmental contacts 21' and 22 extend the respective leads 49 and 50, the lead 49 connecting with the lead 44 at point 51 and the lead 50 connecting the audible signals 28 and lamps 31 through switch 54 and line 52, the signals and lamps then being connected through ground 53 with the battery 45. The ground 53 and ground 46 are preferably through the frame of the vehicle. The switch 54 controls the operation of both the signals 28 and lamps 31.

It will be observed that the vehicle operator pressing the button 37 will move the flexible member 38 associated therewith to form a circuit between lines 40 and 44, causing a circuit through the battery motor line 48 to spring contact finger 24'. This causes the motor to operate until such time as the member $18^2$ breaks contact between points 24' and 24, interrupting the motor circuit and causing the semaphores to move to the position illustrated in the center view of Fig. 2, and during this movement, the audible signal is sounded, this circuit being made between segments 21' and 22 and contacts 19' and 20'. The lights 31 are controlled by switch 54.

It will be observed that the selective operation of the buttons 37 to $37^3$ inclusive enables the semaphore members 1 and 1' to be rotated to any one of the plurality of predetermined positions and during such rotation the audible signal will be sounded, but that the audible signal does not sound when the semaphores are pointed, indicating that the vehicle is travelling in a forward direction.

The rear semaphore 1' is preferably formed on its forward end at the thumb, middle, ring and little fingers, with openings closed by translucent members 60 which preferably contain letters forming the word Stop. This designation may be flashed on the turning of the semaphores one half revolution from normal driving indicating position and the operation of the switch 54.

It is to be observed that the gear 18 drives the flexible shaft in one direction only so that in applying the invention to an automobile, the flexible shaft may be driven so as to take up any and all lost motion therein, following which the gear should be set to obtain the proper position of the contact arm for closing the circuits and opening the circuits controlled thereby at the proper intervals when the signals are in the desired position. The friction tending to retain the signals in adjusted position will serve to prevent their movement after being set so that in subsequent operations of the signal mechanism, the lost motion already having been compensated for, will not interfere with the setting of the signals in the desired position according to the control imposed upon the operating mechanism.

Having thus described my invention, what I claim as new and desire to protect by Letters Patent of the United States is:—

A vehicle direction indicator device, including independent primary and secondary electric circuits, a source of electric supply for both circuits, an electric-magnetic motor connected in the primary circuit and having a rotatable motor shaft, a second rotatable shaft, means connecting the motor shaft and said second shaft so that said shafts rotate simultaneously, a semaphore mounted on said second shaft to rotate therewith, an electric control means having a plurality of connected contacts in spaced relation, an insulated radial arm mounted on said second shaft to rotate therewith and adapted to move between and successively break the said primary circuit through said respective connected contacts, said radial arm having a pair of connected contact points mounted thereon, a multiple switch for operating the magnetic electric motor, said multiple switch having the required number of contacts connecting with the respective contacts of said electric control means to close said primary circuit for moving the semaphore to a predetermined position, a pair of spaced arcuate contacts connected in said secondary circuit, cooperating with said pair of connected contact points mounted on the said circuit-breaking radial arm, and having a gap providing an insulated portion adapted to break the said secondary circuit when the semaphore is at one of the pre-determined positions, and an electric audible signalling device connected with said secondary circuit and operating only when said secondary circuit is completed through said arcuate contacts.

In testimony whereof I have signed my name to this specification.

OTIS C. BRYAN.